United States Patent [19]

Bertram et al.

[11] Patent Number: 5,038,279

[45] Date of Patent: Aug. 6, 1991

[54] DIRECT HOT-KEYING WITH RESET OF PRINTER PARAMETERS FOR A SECONDARY APPLICATION INCLUDING A TYPEWRITER EMULATOR

[75] Inventors: Randel L. Bertram; Douglas E. Hays; James F. Lederer, all of Lexington, Ky.

[73] Assignee: Lexmark International, Inc., Greenwich, Conn.

[21] Appl. No.: 529,695

[22] Filed: May 22, 1990

[51] Int. Cl.$^5$ .......................... G06F 3/02; G06F 3/03; G06F 7/00

[52] U.S. Cl. ............................ 364/200; 364/225.6; 364/235; 364/236; 364/239.3; 364/260.4; 364/274.1; 364/275.1; 364/280.7

[58] Field of Search ... 364/200 MS File, 900 MS File

[56] References Cited

U.S. PATENT DOCUMENTS

| | | | |
|---|---|---|---|
| 4,106,101 | 8/1978 | Harrison | 364/900 |
| 4,195,353 | 3/1980 | Abe et al. | 364/900 |
| 4,212,077 | 7/1980 | Vittorelli | 364/900 |
| 4,284,362 | 8/1981 | Jackson et al. | 364/900 |
| 4,377,852 | 3/1983 | Thompson | 364/900 |
| 4,458,311 | 7/1984 | Clements et al. | 364/200 |
| 4,458,331 | 7/1984 | Amezcua et al. | 364/900 |
| 4,539,653 | 9/1985 | Bartlett et al. | 364/900 |
| 4,603,385 | 7/1986 | Mueller et al. | 364/200 |
| 4,641,263 | 2/1987 | Perlman et al. | 364/900 |
| 4,642,792 | 2/1987 | Clements et al. | 364/900 |
| 4,709,349 | 11/1987 | Hashimoto et al. | 364/900 |
| 4,716,543 | 12/1987 | Ogawa et al. | 364/900 |
| 4,727,480 | 2/1988 | Albright et al. | 364/200 |
| 4,750,116 | 6/1988 | Pham et al. | 364/200 |
| 4,775,953 | 10/1988 | Goettelmann et al. | 364/900 |

Primary Examiner—Joseph A. Popek
Assistant Examiner—George C. Pappas
Attorney, Agent, or Firm—John J. McArdle, Jr.

[57] ABSTRACT

A computer system operating under software control to provide output to a printer for printing. The computer system sets printer parameters to accommodate different forms of output to the printer. A word processing program stored in the computer memory is executed to couple information for printing to the printer with the printer in a first set of printer states. A typewriter emulator program stored in the computer memory is executable to couple information for printing to the printer and to set the printer states. The word processing program is interrupted by a hot key depressed by an operator, and the typewriter emulator program is entered, with the printer states being set in dependence upon printer state information for the typewriter emulator. When the typewriter emulator is interrupted by a hot key, the then-current printer states are stored and a set of default printer states for the word processor are restored prior to returning to execution of the word processing software.

3 Claims, 3 Drawing Sheets and

DIRECT HOT-KEYING WITH RESET OF PRINTER PARAMETERS FOR A SECONDARY APPLICATION INCLUDING A TYPEWRITER EMULATOR

FIELD OF THE INVENTION

This invention relates generally to a computer system operating under software control to provide output to a printer for printing. The invention more particularly concerns such a system which sets printer parameters to accommodate different forms of output to the printer.

BACKGROUND OF THE INVENTION

In computer systems such as personal computer systems, many programs for different applications (e.g., word processing, database management, development of spread sheets) can be executed. Typically, this is accomplished by loading the application software program from a storage medium, usually a disk, into the computer memory and executing the program. After completing some or all of a first application, data or documents may be printed by a printer or saved on a disk. To execute a second application, the first application is ended, and the software program for the second application is loaded into the computer memory in place of the first program.

In some cases, more than one application program is stored in memory at the same time, and provision is made for selectively executing a desired one of the two or more application programs. In such situations, the computer system usually includes software for terminating the execution of a first application program temporarily, permitting the execution of a second application program, with subsequent return to the operating point in the first application program at which execution was terminated.

This exit from, and return to, an application is often accomplished by the use of a "hot-key" approach in which the depression of a particular key or combination of keys at a keyboard results in the transfer of operation between the two applications. Ordinarily, in performing such direct hot-keying between programs, the primary application is "frozen" at a then-current execution point, during the hot-keying to a secondary application and the execution of that secondary application. There are difficulties in implementing the above-described hot-keying where both applications provide output to a printer, since the printer must be properly set to print the output from each application when that application is running.

As an example, and as will be discussed subsequently with regard to an exemplary embodiment, the invention to be described may be used advantageously where the primary application is a memory resident word processing program and a secondary application is a memory resident typewriter emulator program. Direct hot-keying is desirable in such a situation since it allows the operator to effectively switch back and forth between word processing and typewriter functions, without the need to exit from one program and to restart the other program each time a change is made between programs.

When operating within a word processing program, hot-keying out of the word processor is normally accomplished by memory resident task selection software which intercepts keystrokes to determine if the operator has depressed the hot key. This hot key software suspends the operation of the word processor in response to the hot key. When exiting the word processing application, the hot key software saves current parameters to permit a return to the same point in the word processor application when the microprocessor later exits the secondary application. Printer states for the word processing application software can be restored to the correct conditions upon return since the word processing software expects to find the printer in known default states.

The use of such hot key task selection software for controlling exiting from, and returning to, a secondary application such as a typewriter emulator is more difficult to implement because there are no "default values" to which to reset the printer. In addition, a typewriter emulator program must maintain changeable operating format information such as margins and tab stops.

It has been an objective of the present invention, therefore, to provide means for direct hot-keying between software applications which provide printer output, wherein the proper printer states, or parameters, are restored before each application provides output to the printer for printing.

SUMMARY OF THE INVENTION

This objective has been accomplished in accordance with certain principles of the invention by providing at least one software application in a hot key environment which itself detects and processes a hot key signal while still remaining active. In one form of the invention, hot key task selection software handles the interruption of a primary task, for which printer states are restored to default values, but the secondary application itself detects and processes the hot key signal.

In a case in which the primary application is a word processor and the secondary application is a typewriter emulator, program steps are included in the typewriter emulator application which permit the processor to recognize the depression of a hot key by the operator while continuing the execution of the typewriter software. The processor, through execution of the typewriter software, then saves the necessary current printer parameters for use during a subsequent return to the typewriter application.

The typewriter software also places an appropriate pointer to the location in the typewriter emulator program where execution of processing keystrokes should begin upon return to the typewriter emulator so that when the typewriter emulator application is recalled, the processor returns to the proper location in the typewriter application software code to continue the typewriter task. Typewriter margin and tab format information is also stored in memory allocated to the typewriter emulator. The typewriter software contains program steps to effect the restoration of default printer parameters upon return to the word processor so that the word processor software can properly provide output to the printer.

Further advantages of the invention, and the manner of their implementation, will become apparent upon reading the following detailed description and upon reference to the drawings in which:

DESCRIPTION OF THE PREFERRED EMBODIMENT

Figure 1:
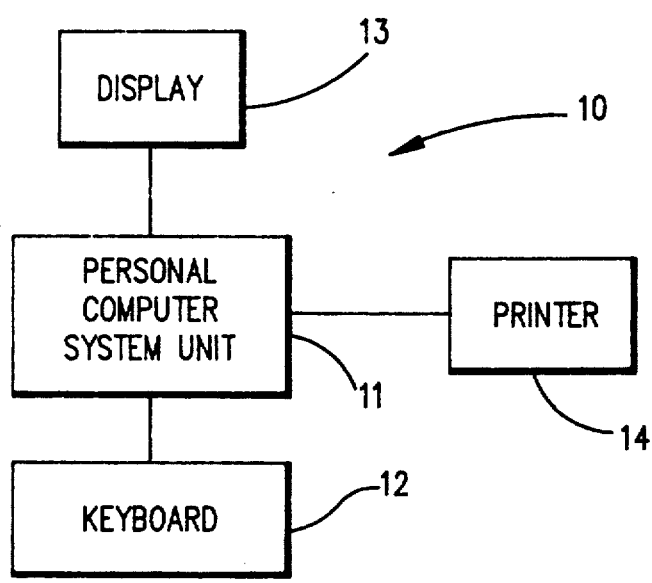
FIG. 1 is a diagrammatic illustration of a personal computer system for implementing the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as described by the appended claims.

Turning initially to FIG. 1, a personal computer system 10 includes a system unit 11 connected to a keyboard 12, a display 13, and a printer 14. In the illustrated form of the invention, the personal computer system 10 comprises a personal computer system unit 11 including a microprocessor from the Intel 8086/8088 family of microprocessors and random access memory (RAM) available thereto. The system unit 11 also includes a disk drive for loading application software and operating system software into the RAM and suitable interfaces to the display 13 and the printer 14. The system unit 11 is coupled to the keyboard by a standard bidirectional serial interface and to the printer 14 by a standard parallel printer interface. The system unit random access memory is suitable for storage of programs, including application programs, and is under the control of a disk operating system (DOS) and basic input/output system (BIOS). The system unit 11 and the keyboard 12 may be, for example, an IBM Personal System/2 ™ Model 30 personal computer, and the printer 14 may be an IBM Correcting Quietwriter ® or Correcting Wheelwriter ® printer.

In the present instance, the system unit 11 is operable under the control of an application program which performs word processing functions and an application program which emulates the operation of an electronic typewriter. These application programs are loaded into the computer RAM and are memory resident. In the following description, hot-keying from the execution of one of these applications to the other, and the return to the original application, shall be discussed in some detail. The actual operations within the application programs are not, for the most part, germane to the invention and will not be described in detail.

Figure 2A:
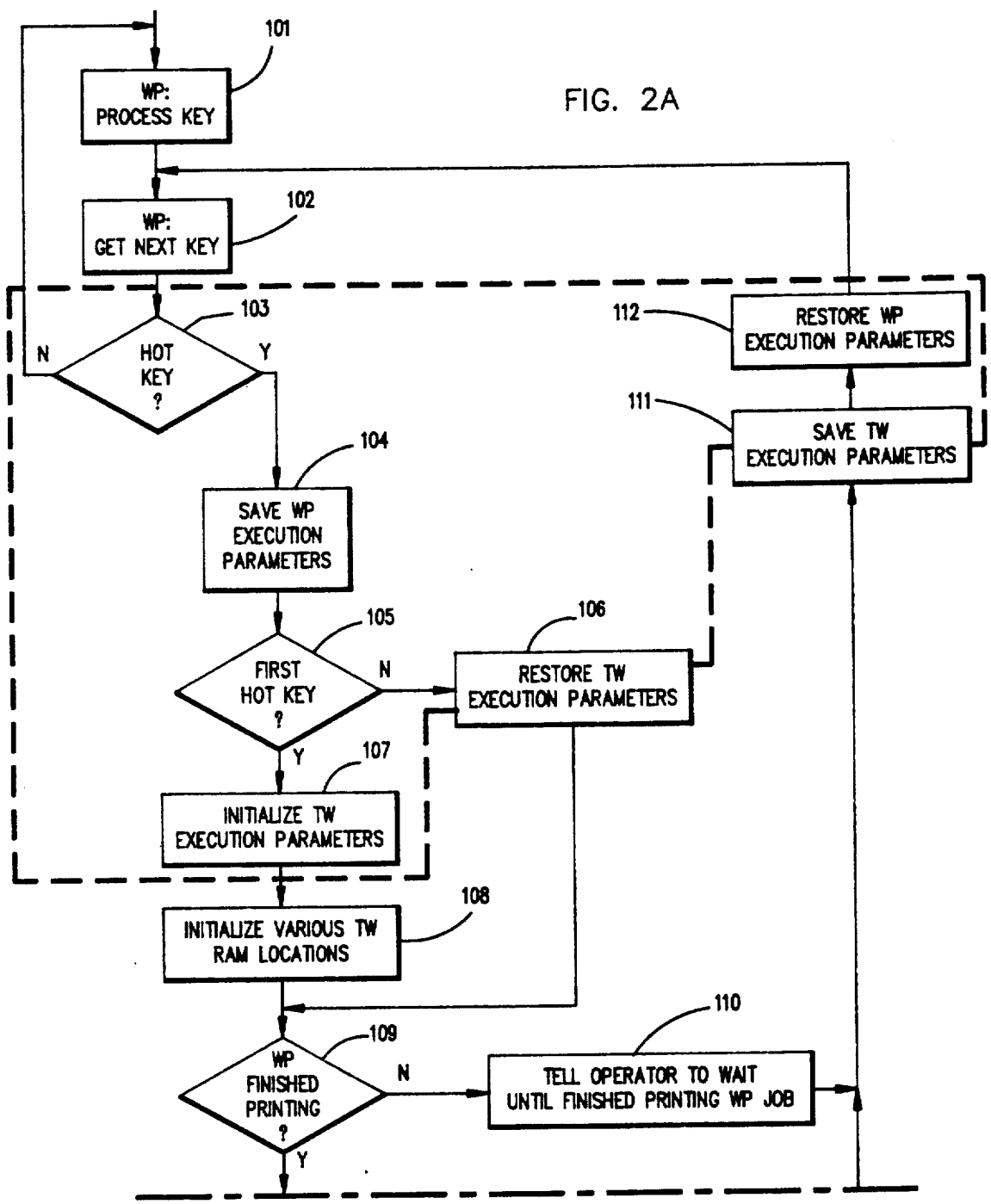
FIG. 2, formed by connecting FIGS. 2A and 2B at the dashed lines, is an illustrative flowchart of certain portions of a hot-key task selection program, a word processor program, and a typewriter emulator program, including printer parameter restoration, for implementation by the processor in the system of FIG. 1.
Figure 2B:
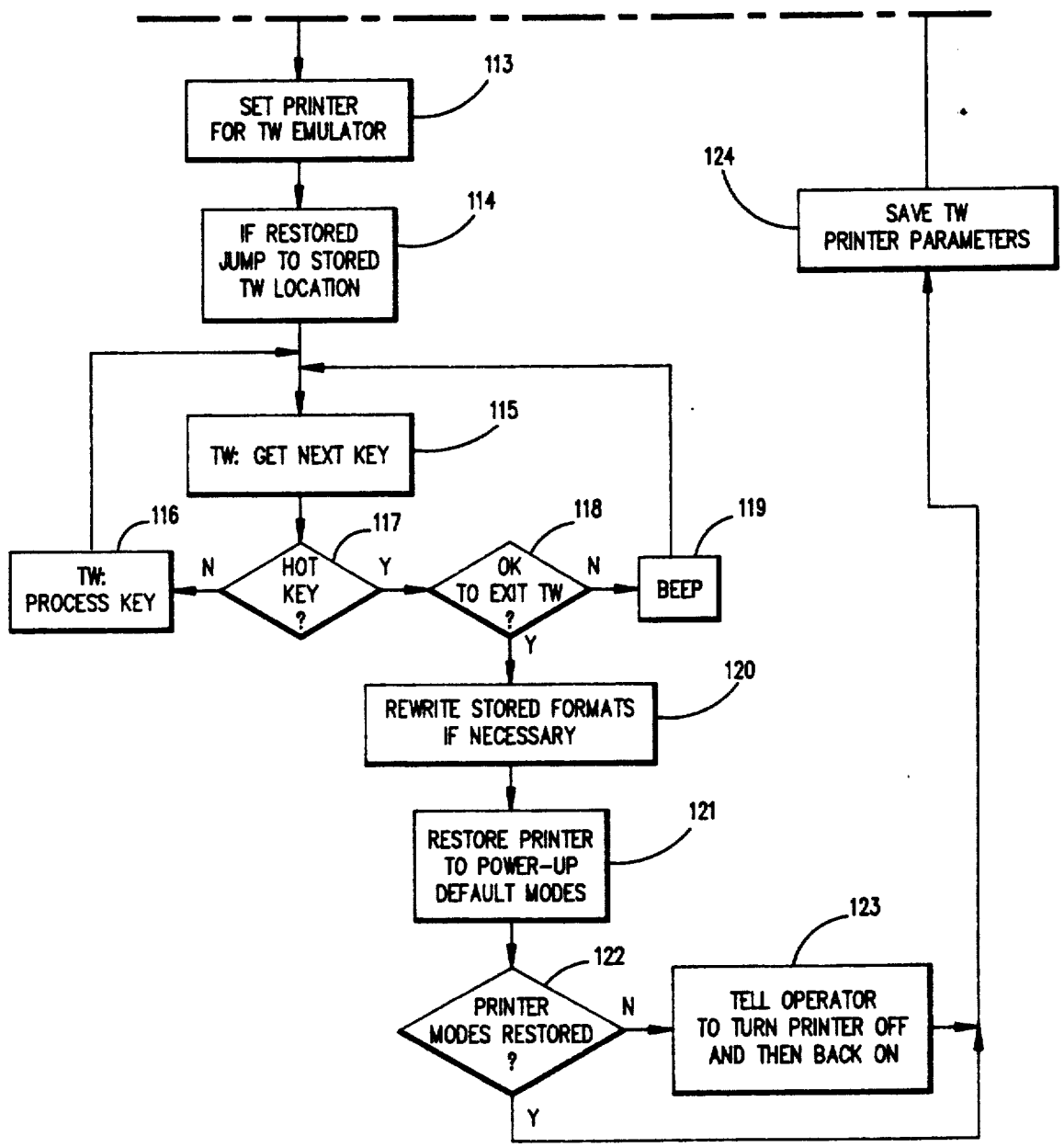

Beginning, for purposes of illustration, at a time at which the microprocessor in the system unit 11 is executing the word processing program, and with additional reference to FIG. 2, each keystroke from the keyboard is received and processed (step 101). Processing a keystroke typically entails placing an alphanumeric character at the appropriate location in the display memory so that the character is displayed on the display. Processing a keystroke also entails storing the character in memory, for instance as part of a document, for subsequent storage on disk or printing on the printer. After processing a keystroke, the microprocessor obtains (102) the next key for processing.

As each key is obtained by the microprocessor, the key is checked (103) to determine if it is the hot-key, calling for execution of the typewriter emulation software by the microprocessor. If not, the microprocessor executes the word processing software to process the key and gets the next key.

The hot key is identified by intercepting and reading keystrokes from the keyboard at the operating system level, in known fashion. The task selection software is loaded from a disk and is memory resident, as are the word-processing and the typewriter emulator programs. The task selection software is represented by the program steps within the dashed lines of FIG. 2, including the "HOT KEY?" decision block (103). The task selection software merely passes on the keystrokes, other than the keystroke representative of the hot key, without interfering in the operation of the word processor program.

In subsequent description, reference will be made to the performance of functions by the software programs such as the word processing program or the task selection program. This should be understood to refer to the performance of functions by the microprocessor in the execution of the named software programs.

Once the hot key is recognized, the task selection software leaves the word processor "suspended" by stopping the execution of the keystroke processing routine. The task selection software then saves (104) the word processor execution parameters. The execution parameters of an application program can vary. For background, the following brief description of execution parameters and RAM locations, which must be initialized, is provided.

Before a program, such as the present word processing program, can begin executing, various registers and (RAM) memory locations must be initialized for the software to execute properly. In the illustrated system, exemplary registers are the segment registers relating the 64 kilobyte segment addresses of the code (CS), data (DS), and stack (SS) segments. Among the various RAM locations are (a) the critical error handler address, which tells the operating system the address to which to jump whenever an unexpected error (such as no diskette in the diskette drive) occurs, and (b) the terminate address, which tells the operating system the address to which to jump whenever the current program terminates.

The above-mentioned execution parameters and RAM locations for the word processor are initialized by the operating system in the computer, which is responsible for loading programs since, in the present system, the word processor is the first program to be run.

When the task selection software responds to the hot key, the word processor execution parameters must be stored because the microprocessor will, in most cases, return to the word processor application in response to a hot key rather than by re-loading the word processing program with attendant initialization of the parameters. The RAM locations allocated to the word processor maintain their values without the need for re-initialization or restoration.

After the word processing software execution parameters are stored, the task selector determines (105) if the hot key has been utilized earlier in this operating session. If this is not the first hot key to the typewriter emulator, the task selector restores (106) some of the typewriter emulator execution parameters which have been stored (as will be described hereinafter) from the most recent execution of the typewriter emulator.

Control is then given to the typewriter emulator, which restores the remainder of the typewriter emulator execution parameters. In the present system, the task of the restoration of typewriter execution parameters (and of saving these parameters) is shared between the task selector and the typewriter emulator as a matter of convenience. It is, however, preferable to have the typewriter emulator, in any event, restore (and save) certain execution parameters most accessible to it, such as the microprocessor stack pointer and the pointer to the location in the typewriter program where the processing of keystrokes should begin.

If this is the first use of the hot key to enter the typewriter emulator program, the task selector initializes (107) the typewriter emulator execution parameters, based upon parameter information which is part of the task selector software. As previously mentioned, normally the above parameters are initialized by the disk operating system (DOS), which in most cases is responsible for loading and executing programs. However, in the present environment, the task selection software effects the first execution of the typewriter emulator program and thus must be responsible for initializing these parameters. The task selector then exits to the typewriter emulator.

The typewriter emulator next initializes (108) various typewriter random access memory (RAM) locations. For explanation, when the typewriter emulator software is first given control, its data area in RAM must be initialized. Certain data areas must be set to default values to insure that the software runs consistently time after time. Exemplary of these data areas are the correction buffer, which must be initialized to reflect that there is nothing in the buffer, the default margin and tab locations, the current printer modes to reflect the power-on state of the printer, and various flags to clear conditions such as being in centering mode or in the automatic carriage return zone. Conveniently, saved margin and tab information is kept in a file on disk and is read into memory by the typewriter software in lieu of the default values at this time.

Next the typewriter emulator determines (109) if the word processing software job has finished printing, if there was a printing job in process. If the printer is not finished printing, a message is displayed on the display screen telling (110) the operator to wait until the word processing task is complete before switching to the typewriter emulator. In this event, the typewriter execution parameters are saved (110) (by the typewriter emulator and the task selector), and the word processor execution parameters are restored (112) (by the task selector) before returning to execution of the word processor software. Since the printer has not been changed at this time by the typewriter emulator, the printer remains in operation in the modes set for the word processing job in process.

If the printer has finished printing (109) the word processor job, if any, the typewriter emulator resets, or initializes, (113) the printer parameters for typewriter emulation. For example, among printer parameters which are changed, paper handling is changed from automatic to manual mode and a font is selected. Other printer parameters include line spacing, line length, and selection of character print modes such as expand, underscore, superscript, or subscript, if necessary. The values of these printer parameters are kept in RAM allocated to the typewriter emulator. The parameter values are stored when the typewriter emulator RAM locations are initialized if this is the first time the operator hot keys into the typewriter emulator. Subsequent to initialization, these printer parameters can be changed by the operator in using the typewriter emulator, and the current parameter values are updated and kept in the RAM area set aside for the typewriter emulator. Conveniently, the current values or states of these printer parameters are shown to the operator on the display.

After setting the appropriate printer parameters, the typewriter emulator then executes (114) a jump instruction to the point in the typewriter emulator software corresponding to where the typewriter emulator last exited (unless this is the first hot key to the typewriter emulator). The jump is to a location within the typewriter code symbolically represented by the "TW:PROCESS KEY" block. The location is identified by a pointer restored with the typewriter execution parameters. For example, dependent upon the point jumped to in the typewriter emulator, the printer print head may be moved to a particular location relative to the paper, or particular information may be displayed on the display. The operator is thus returned to the operator's previous typewriter set up, with the printer ready to continue a typewriter task.

The typewriter emulator then responds to keyboard entries by getting (115) and processing (116) each keystroke so long as the hot key for returning to the word processor is not depressed. The typewriter emulator functions, typically, to directly respond to keystrokes to place characters on paper in the printer.

After completing the desired typewriter task, the operator may depress the hot key to return to the word processing software. In this event, the typewriter emulator checks, upon recognizing (117) the hot key, if it is appropriate to exit (118) the typewriter emulator software at this time. If it is not appropriate, an indication such as an audible beep (119) is given to the operator and the processor remains in execution of the typewriter emulator software. It is, for example, inappropriate to exit the typewriter emulator software during communication with the printer to determine a printer parameter such as the pitch of the printer.

If it is acceptable to exit from the typewriter emulator, the typewriter emulator determines if the margin and tab format settings have been changed from those present when the typewriter emulator was entered. If so, the typewriter emulator rewrites (120) the file on disk containing this print format information. The typewriter emulator next restores the printer to its power-up default states, which will be expected by the word processor. It is possible that the typewriter emulator software may be unable to restore (122) the printer modes. For example, if the printer has gone off line, a message is displayed requesting (123) that the operator turn the printer off and back on. After the printer states have been restored, or a suitable message displayed to the operator, the typewriter emulator saves (124) the typewriter printer parameters. The typewriter emulator then saves (111) its portion of the typewriter execution parameters. Among these is the pointer to the location to which to jump in the typewriter program on the next return, as described above. Control is then given to the task selector, which stores (111) the balance of the typewriter execution parameters. The task selector then restores (112) the word processor execution parameters and the word processor resumes operation in the same mode in which it was exited.

What is claimed is:

1. In a computer system including (a) a memory, (b) a single processor for executing programs stored in the memory, (c) a printer coupled to the processor for printing information from the processor and having printer states which are settable by the processor in its execution of programs, (d) a first program stored in the memory executable by the processor to couple information for printing to the printer wherein the printer is in a first set of printer states, and (e) a typewriter emulator program independent of the first program stored in the memory executable by the processor to couple information for printing to the printer and to set the printer states, the improvement comprising:

means for selectively interrupting the execution by the processor of the first program;

means for determining if the printer has finished printing a printing job in process;

means for preventing execution of the typewriter emulator program if the printer has not finished printing a printing job in process;

means for initiating execution of the typewriter emulator program after interruption of the first program, including means for setting the printer states in dependence upon printer state information, related to a previous execution of the typewriter emulator program, stored in the memory, if the printer has finished printing any printing job in process and means for jumping to an execution point in the typewriter emulator program in dependence upon a pointer to a location in the typewriter emulator program stored in the memory after the printer states have been set;

means for selectively producing a signal for the interruption of execution of the typewriter emulator program and for the execution of the first program, means for determining if it is appropriate to exit the typewriter emulator program;

means for preventing exiting the typewriter emulator program if exiting is inappropriate,;

means for storing the current printer states in effect for the execution of the typewriter emulator program to couple information for printing to the printer, as printer state information in the memory in response to said signal and for interrupting the execution of the typewriter emulator program, if it is appropriate to exit the typewriter emulator program;

means for storing a pointer to a location in the typewriter emulator program, related to the execution point of the typewriter emulator program when it is interrupted, in response to said signal;

means for restoring the printer states to the first set of printer states after said current printer states have been stored; and, means for returning to execution of the first program after execution of the typewriter emulator program has been interrupted.

2. The improvement of claim 1 which further comprises means for storing margin and tab format information used by the typewriter emulator program in the memory and means for saving said margin and tab format information on a non-volatile storage medium in response to said signal for the interruption of execution of the typewriter emulator program if it is appropriate to exit the typewriter emulator program.

3. The improvement of claim 2 in which the means for saving the margin and tab format information to a non-volatile storage medium saves said information only if it has changed during the execution of the typewriter emulator program.

* * * * *